United States Patent [19]

Sywulka

[11] Patent Number: 5,419,156
[45] Date of Patent: * May 30, 1995

[54] REGENERATIVE SORPTION COMPRESSOR ASSEMBLY

[75] Inventor: Philip H. Sywulka, Whittier, Calif.

[73] Assignee: Aerojet-General Corporation, Rancho Cordova, Calif.

[*] Notice: The portion of the term of this patent subsequent to May 30, 2009 has been disclaimed.

[21] Appl. No.: 532,815

[22] Filed: Jun. 4, 1990

[51] Int. Cl.[6] .................. F25B 15/00; F25B 7/00; F17C 11/00
[52] U.S. Cl. ..................... 62/476; 62/46.1; 62/467; 62/480; 62/481; 165/104.12
[58] Field of Search ............... 62/46.1, 52.1, 467, 62/476, 477, 480, 481; 165/104.12

[56] References Cited

U.S. PATENT DOCUMENTS

| | | | |
|---|---|---|---|
| 4,055,962 | 11/1977 | Terry | 62/102 |
| 4,188,795 | 2/1980 | Terry | 62/102 |
| 4,281,969 | 8/1981 | Doub | 417/52 |
| 4,779,428 | 10/1988 | Chan et al. | 62/467 |
| 5,046,319 | 9/1991 | Jones | 62/46.2 |

OTHER PUBLICATIONS

Operating Characteristics of a Hydrogen Sorption Refrigerator—Part I, Experiment Design and Results by K. Karperas, Proceedings of the Fourth International Cryogenic Conference, Easton Maryland (1986).
Development Testing of an 80K Oxide Sorption Cryocooler by S. Bard and J. Jones, Proceedings of the Fifth International Cryogenic Conference, Monterey, California (1988).
Deisgn Life Testing and Future Designs of Cryogenic Hydride Refrigeration Systems by J. Jones and P. Golden, Cryogenics, vol. 25 (1985).

Primary Examiner—Henry A. Bennett
Assistant Examiner—William C. Doerrler
Attorney, Agent, or Firm—Leonard Tachner

[57] ABSTRACT

A regenerative sorption compressor assembly for use in a sorption compressor/refrigerator system. The regenerative sorption compressor assembly of the present invention comprises a series of sorption compressor elements connected to a flowing loop of heat transport fluid. The compressor elements are heated and cooled by the heat transport fluid. At some point in the loop the fluid path is broken and the fluid is diverted to a heat source. At another point in the loop the fluid path is broken and the fluid is diverted to a heat sink. The points at which the heating and cooling flows are diverted are switched from compressor element to element in the direction of fluid flow at such a rate that the thermal capacity rate of the fluid in the heat transport loop relative to the moving switch point is equal and opposite to the thermal capacity rate of the compressor assembly relative to the switch point. The unique thermal recovery concept of the present invention provides a significant improvement in operating efficiency for a cryogenic refrigerator.

26 Claims, 5 Drawing Sheets

REGENERATIVE SORPTION COMPRESSOR ASSEMBLY

FIELD OF THE INVENTION

The present invention relates generally to refrigerative systems such as those used primarily for cooling spacecraft electronics and more specifically, to a high efficiency sorption refrigeration system designed to recover thermal energy flows required for the sensible heating and cooling of sorption compressor elements in a sorption compressor/refrigerator system. Recovery of this energy dramatically reduces input energy and heat rejection requirements for a given refrigerator capacity. For space-borne systems, these savings translate into significant weight and size savings in the heat source and heat rejection radiator systems.

PRIOR ART

Cooling requirements for space-based infrared sensors as well as for other electronic systems that are designed to operate at low temperatures have become demanding. These requirements include long-life, such as a period of 5-10 years or more, low input power, small mass and volume and a wide range of operating temperatures such as for example, the range of 5 degrees Kelvin to 200 degrees Kelvin. In addition, such spacecraft cryogenic refrigerators must be vibration free in order to not interfere with the high sensitivity of optical devices. At present there are no refrigerators capable of meeting the stringent performance and reliability requirements for such applications.

A sorption cryocooler could potentially meet these requirements. Several laboratory sorption coolers have been built and tested and these demonstrate the feasibility of sorption refrigerators operating at cryogenic temperatures. For example, see the article by K. Karperos entitled "Operating Characteristics Of A Hydrogen Sorption Refrigerator—Part I, Experiment Design and Results" in the Proceedings of the Fourth International Cryogenic Conference at Easton, Md. (1986), see also the article by S. Bard and J. Jones entitled "Development Testing Of An 80K Oxide Sorption Cryocooler" in the Proceedings of the Fifth International Cryocooler Conference at Monterey, Calif. (1988), and also see the article by J. Jones and P. Golben entitled "Design Life Testing And Future Designs Of Cryogenic Hydride Refrigeration Systems" in Cryogenics, Vol. 25 (1985). Unfortunately however, all of these prior art sorption coolers have exhibited extremely high input power requirements which is limiting of their potential application. Therefore, before such otherwise highly advantageous, high reliability, non-mechanical refrigeration systems can be used in spacecraft applications, means must be found to significantly increase their efficiency so that their input power requirements can be made at least comparable to equivalently performing mechanical refrigeration systems.

SUMMARY OF THE INVENTION

The present invention comprises a regenerative sorption compressor assembly designed for use in a sorption compressor/refrigerator system the primary application of which is long-life cryogenic refrigeration in space. The regenerative assembly concept is a means of connecting compressor elements so that the heat flows required for sensible heating and cooling an element are largely recovered and passed on to other elements. The regenerative sorption compressor assembly consists of a series of sorption compressor elements connected to a flowing loop of heat transport fluid. The heat transport fluid may be a gas such as helium or a liquid such as Dowtherm. The compressor elements are heated and cooled by the heat transport fluid. At some point in the loop the fluid path is broken and the fluid is diverted to a heat source. At another point in the loop the fluid path is broken and the fluid is diverted to a heat sink. The points at which the heating and cooling flows are diverted are switched from compressor element to element in the direction of fluid flow at such a rate that the thermal capacity rate of the fluid in the heat transport loop relative to the moving switch point is equal and opposite to the thermal capacity rate of the compressor assembly relative to the movement of the switch point.

A number of different switching schemes may be used for switching of the diversion points for heating and cooling the heat transport fluid. One such scheme comprises a six-port, three-way valve between compressor elements. The three valve positions are straight-through, diverted to hot manifold, and diverted to cold manifold. A second such scheme comprises a four-port, two-way valve between compressor elements. The two valve positions are straight-through and diverted to a manifold. The valves are connected alternatively to the hot and cold manifolds. On both the hot and cold sides of the loop the switch point moves by two compressor elements each cycle. A third scheme comprises a combination of two-port on/off valves and check valves and still an additional scheme comprises the use of central distributors for both the hot and cold diversions with check valves for the straight-through flow on all the connections other than those broken for diversion.

Where the type of heat source being used is suitable, rather than diverting the heat transport fluid to the heat source, heat may be applied directly to the compressor elements in turn, such as by switched electrical heaters on the individual elements or by a concentrated beam of solar energy applied to the compressor elements one at a time by turns.

The number of compressor elements in a sorption refrigerator system will vary based upon design requirements. A small number of elements minimizes losses and reliability risks associated with valves but requires a compressor element design with excellent regenerative effectiveness, namely, high thermal conduction in the direction perpendicular to the travel of the heat transport fluid and excellent thermal isolation in the direction of travel of the heat transport fluid. Efficiency is gained by increasing the compressor element size until parasitic heat losses increase faster than regenerative inefficiency decreases. A large number of compressor elements makes the design less sensitive to the regenerator effectiveness of a single element and allows a smaller total sorbent mass but incurs larger valve losses and has more reliability risks.

Sorbent compressor refrigerative operation relies upon the gas sorbing and desorbing capability of certain materials which permits the pressure level of the gas within a vessel to change non-mechanically by simply heating or cooling the material. Many porous materials and powdered metals such as charcoal, zeolites and metallic hydrides are capable of sorbing large quantities of specific gases. Non-mechanical gas compression can be accomplished by thermally cycling a sorbent material to reversibly sorb gas at low pressure and temperature and then to desorb the gas at high pressure and temperature. The high-pressure gas is then passed through an expansion device to provide cooling at cryogenic temperatures. It will be seen hereinafter that the unique thermal recovery concept of the present invention provides a significant (i.e., order of magnitude) improvement in operating efficiency for a cryogenic refrigerator and in fact, that by using the present invention, such cryogenic refrigerators exhibit an efficiency which is within or superior to the range of efficiencies exhibited by mechanical cryogenic refrigerators.

OBJECTS OF THE INVENTION

It is therefore a principal object of the present invention to provide a sorption refrigerator system with a novel component and heat transport fluid flow configuration for increasing operating efficiency to a level not previously attainable by prior art sorption refrigerators.

It is an additional object of the present invention to provide a high efficiency, high reliability, non-mechanical cryogenic refrigerator that is especially advantageous for use in spacecraft sensor cooling applications, but wherein except for check valves, there are absolutely no moving mechanical compressor parts that would otherwise reduce the reliability thereof.

It is still an additional object of the present invention to provide an improved sorption refrigerator, the compressor assembly of which comprises a series of sorption compressor elements connected in an enclosed loop configuration wherein heat transport fluid flows around the loop and the compressor elements are heated and cooled by the heat transport fluid and wherein the aforementioned heat transport fluid is at one point in the loop diverted to a heat source and at another distinct point in the loop diverted to a heat sink and wherein such diversion points are switched from element to element in the direction of fluid flow at a rate such that the thermal capacity rate of the fluid in the heat transport loop relative to the moving switch point is equal and opposite to the thermal capacity rate of the compressor assembly relative to the switch point.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment of the invention when taken in conjunction with the following drawings in which:

FIG. 4, comprising FIGS. 4a through 4g illustrates various switching hardware options for use in the present invention (FIG. 4g is a top view of the distribution device shown in FIG. 4f);

FIG. 7, comprising FIGS. 7a and 7b, is an end view and cross-sectional side view, respectively, of a compressor element designed for use in the present invention.

DETAILED DESCRIPTION OF A PREFERRED EMBODIMENT

Figure 1:
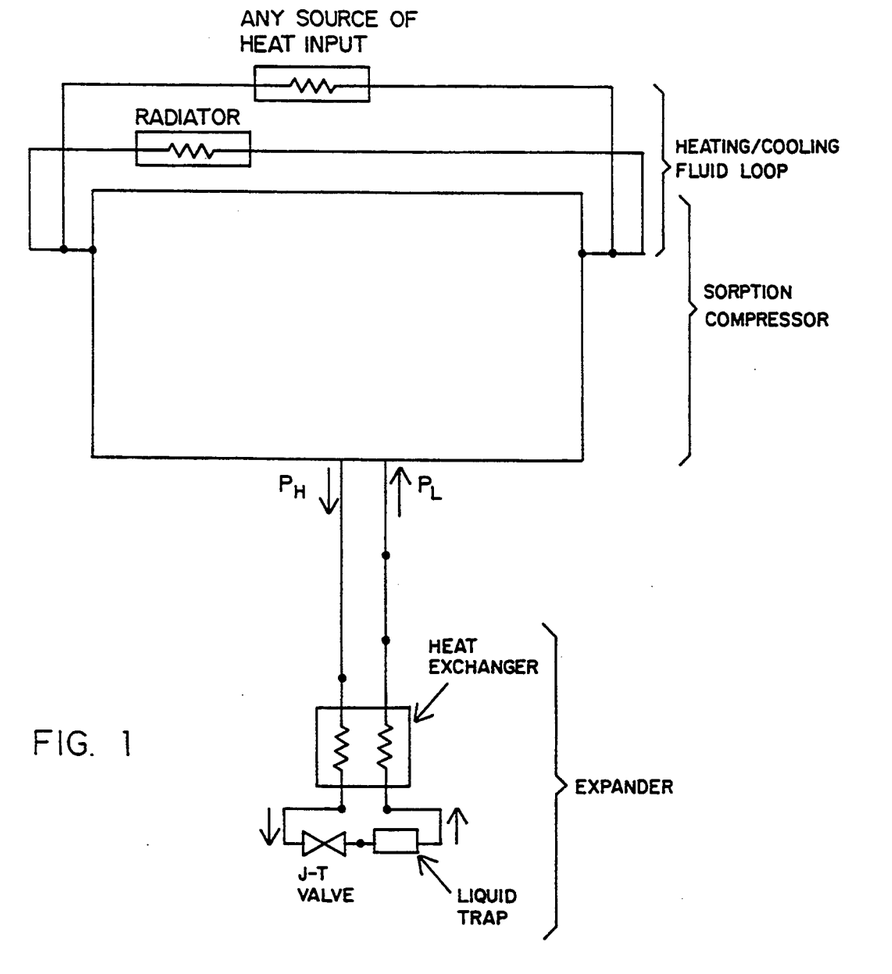
FIG. 1 is a schematic diagram of a single stage sorption cooler.

Referring now to FIG. 1, it will be seen that there is shown therein a schematic of a single-stage sorption cooler. The cooler is made up of three major components comprising: a sorption compressor, a heating-/cooling loop, and a Joule-Thomson expander. A continuous supply of high pressure gas (PH) is supplied to the Joule-Thomson expander through phased thermal cycling of the sorption compressor. The compressor is comprised of several elements that are filled with a sorbent material and a refrigerant gas. Each compressor element is a pressure vessel which in addition to containing the sorbent, is also equipped with heating and cooling loops for the application and removal of heat. The compressor elements are alternately heated and cooled to provide continuous gas flow. Heating a compressor element results in high pressure gas being driven out of the element. The high pressure gas is passed through pre-coolers and heat exchangers to the Joule Thomson valve where it expands isenthalpically and thereby provides refrigeration. After refrigerating the electronics or structure to be cooled, the low pressure gas (PL) returns through the heat exchangers to a cold compressor element where it is adsorbed.

In a complete refrigeration system several such Joule-Thomson refrigerators may be cascaded as stages. Each stage, operating at a different temperature, serves as the pre-cooler for the next cooler stage in the system. For example, a 25 degrees Kelvin refrigerator could use four cascaded stages operating at 190 degrees Kelvin; 110 degrees Kelvin; 70 degrees Kelvin; and 25 degrees Kelvin, respectively. In a space-borne configuration, the coldest stage may be used to cool the sensor elements and focal plane of an infrared detector and the warmer stages may be used to cool, for example, telescope baffles and optics. In a complete system design, consideration must be given to the power, weight and size of the entire satellite thermal control system. This includes radiators; fluid loops; and electrical, radioactive, or solar heat inputs.

Figure 2:
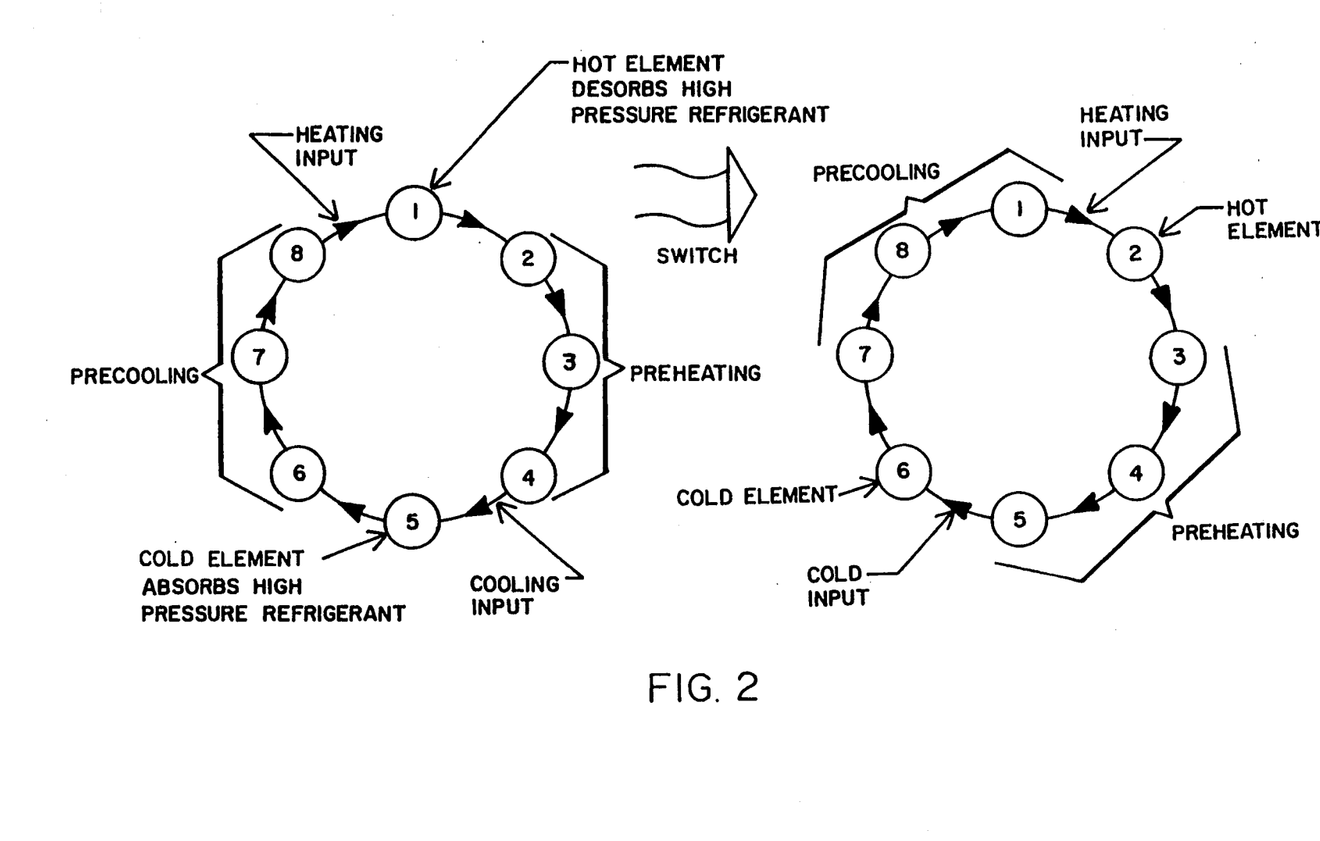
FIG. 2 is a schematic diagram illustrating the loop configuration of the present invention before and after a switching operation.

A schematic of the regenerative sorption compressor concept of the present invention is shown in FIG. 2. Each of the circled numbers (1-8) represents a compressor element. The elements are thermally interconnected by means of a fluid such as helium gas or Dowtherm whose flow is directed to a heat source and a cold sink by active valves. Other thermal switching devices may also be used including for example, gas-gap thermal switches or heat pipes.

The hot helium gas is directed to element 1 which then desorbs high pressure refrigerant. The helium continues to flow through elements 2, 3 and 4, successively heating them and being cooled in return. The helium gas leaves element 4 at very near the cold temperature desired for the system. Helium returns from the cold sink and cools element 5 which absorbs low pressure refrigerant. The helium then successively cools elements 6, 7 and 8, being heated in return and is then directed to the heat source. When element 1 is depleted of refrigerant and element 5 is full of refrigerant, valves between the elements 1-8 are switched so that the hot helium enters the now hot element 2 and heats elements 3, 4 and 5 in turn and then returns to the new cold element 6 and successively cools elements 7, 8 and 1.

It should be noted that when this switch action is made as depicted in FIG. 2, element 2 has been preheated and element 6 has been pre-cooled so that minimal energy flow is required to reach complete absorbing/desorbing temperatures. This cycle continues clockwise around the loop shown in FIG. 2. In effect, the helium is in continuous flow with the compressor elements.

The most efficient regeneration is achieved when the thermal capacity rate of the helium ($\dot{m}C_p$) is equal to the thermal capacity rate of the compressor ($C_{tot}/t_{cycle}$), where $\dot{m}$ is the helium mass flow rate, $C_p$ is the helium specific heat, $C_{tot}$ is the compressor heat capacity, and $t_{cycle}$ is the cycle time. However, the most efficient regenerator is not necessarily the most efficient compressor. The elements must be isothermally hot to fully desorb refrigerant and isothermally cold to fully adsorb refrigerant. Temperature gradients in the hottest and coldest elements reduce the compressor's capacity. It is found that optimum refrigerator performance occurs when:

$$0.8 < \frac{C_{tot}}{\dot{m}C_p t_{cycle}} < 1$$

Having a helium thermal capacity rate greater than the compressor thermal capacity rate in the above-average range, ensures isothermal conditions for the hot and cold elements at minimal cost to regeneration and, therefore, refrigeration efficiency. It should be noted that property variations with temperature also have a significant impact on performance.

Figure 3:
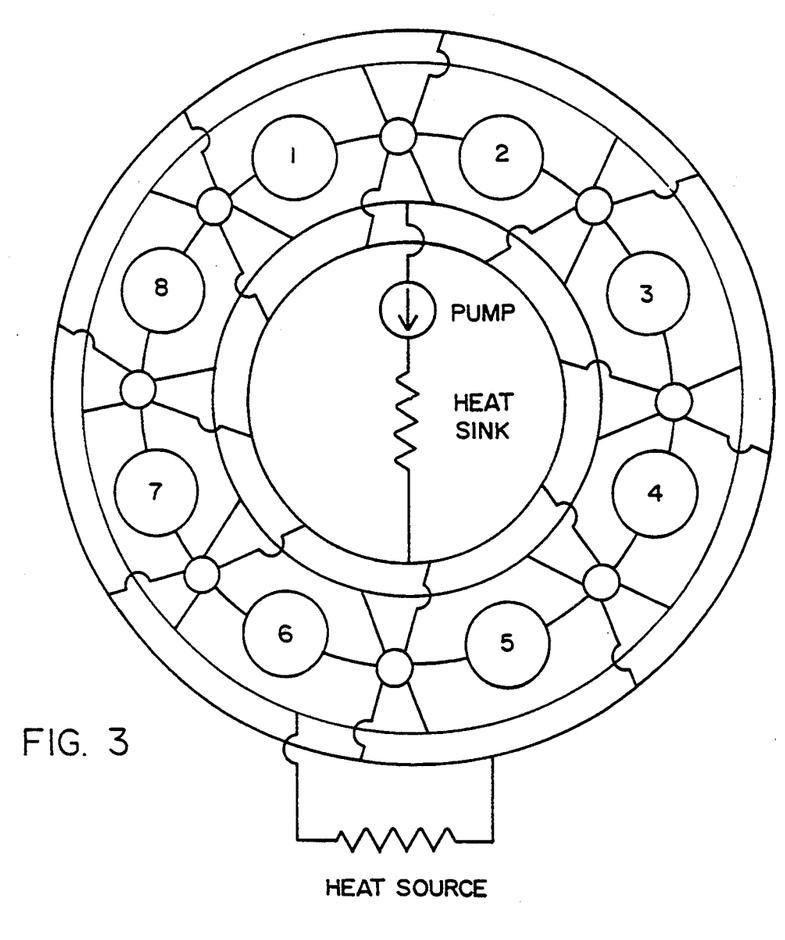
FIG. 3 is a schematic drawing of a compressor loop of the type shown in FIG. 2 but illustrating component and valve switching architecture.

Referring now to FIG. 3, it will be seen that in the preferred embodiment of the present invention the compressor elements 1–8 are interconnected to form a continuous circular loop. Furthermore, it will be seen that between each two compressor elements there is a valve or other form of switching device which is, in turn, connected both to a set of cold manifolds and a set of hot manifolds. The cold manifolds are in turn, connected to a heat sink and the hot manifolds are connected to a heat source. At any given instant of time, one of the valves or other switching elements between two adjacent compressors is in its diverted mode thereby interrupting the flow of thermal fluid between those two compressors and instead diverting it to the set of hot manifolds. At the same instant of time, the valve or other switching element disposed between two other adjacent compressor elements, preferably on the opposite side of the loop, is also in its diverted mode preventing thermal fluid flow between those two compressor elements and instead diverting it to the cold manifolds. The hot helium returning from the hot inlet manifold and entering the compressor element immediately adjacent (clockwise) to the valve diverted to the hot manifolds heats that adjacent element causing it to desorb high pressure refrigerant. Similarly, the helium returning from the cold inlet manifold through the diverted valve cools the immediately adjacent (clockwise) compressor element causing it to absorb low pressure refrigerant. When the heated element is depleted of refrigerant and the cooled element becomes full of refrigerant, the valves are switched so that the valves previously diverted become straight-through valves and the valves immediately adjacent thereto in a clockwise direction around the loop now become the new diverted valves. This process continues sequentially in a clockwise direction around the loop so that during the entire cycle around the loop, each switching valve will become diverted to a hot manifold and at another time it will become diverted to a cold manifold. Similarly, each compressor element will at one time during the cycle around the entire loop be heated by the helium returning from the hot inlet manifold resulting in desorption of the high pressure refrigerant and at a different time will be cooled by the thermal fluid returning from the cold inlet manifold causing absorption of the low pressure refrigerant.

We refer to the compressor element immediately adjacent to the diverted valve connected to the hot manifold, as the principal heated element for a particular switching cycle and similarly, we refer to the compressor element immediately adjacent to the diverted valve connected to the cold manifolds as the principal cooled element. It can then be stated that the compressor elements immediately clockwise of the principal heated and principal cooled compressor elements are being preheated and precooled, respectively, by the respective hot and cold temperatures of the heat transfer helium exiting the immediately adjacent principal elements. Consequently, when the next switching operation occurs and these preheated and precooled compressor elements, respectively, become the new principal heated and principal cooled compressor elements, respectively, only minimal energy flow will be required to reach complete absorbing/desorbing temperatures. It is this maximum use of available thermal energy which produces the extremely high operating efficiency of the present invention.

Figure 4:
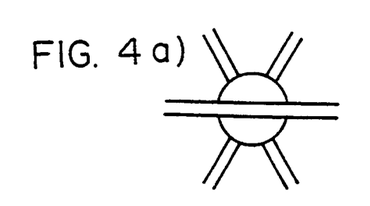
Figure 4G:
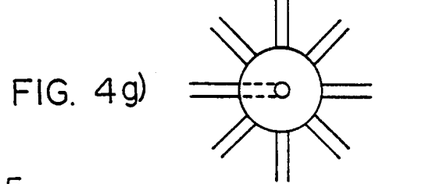

FIG. 4 illustrates a number of alternative valve and other switching options which may be used to selectively divert the thermal fluid from the compressor element loop to either the hot or cold manifolds. More specifically, as seen in FIG. 4a and FIG. 4b one valve option comprises a six-port, three-way valve which is shown in its straight configuration in FIG. 4a and in its diverted configuration in FIG. 4b. Another option comprises a four-port, two-way valve which is shown in its straight-through configuration in FIG. 4c and in its diverted configuration in FIG. 4d. Still another possible switching option is shown in FIG. 4e which comprises the combination of a number of two-port valves and a check valve. The diverted position for this combination is shown in FIG. 4e. Still another such optional switching implementation is shown in FIGS. 4f and 4g. The configuration of FIGS. 4f and 4g consists of a central distributor and a check valve with the position of the distributor determining whether the flow is diverted or straight-through. Only the diverted position is shown in FIGS. 4f and 4g.

Figure 5:
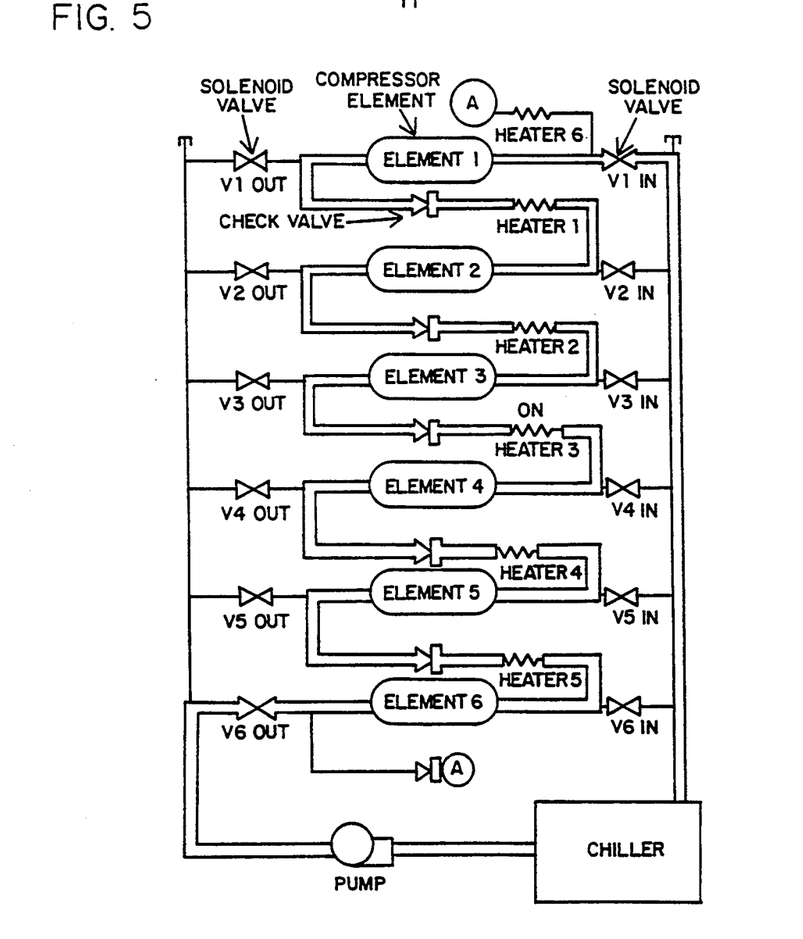
FIG. 5 is a block diagram representation of a heating-/cooling fluid loop of the present invention.

A schematic of the heating/cooling loop and compressor is shown in FIG. 5. In this particular embodiment the fluid loop is composed of six compressor elements: one chiller; one pump; an inlet manifold utilizing six solenoid valves; an outlet manifold also utilizing six solenoid valves; six heater elements; six check valves and associated plumbing. The heating/cooling fluid is helium at a nominal pressure of 2.068 MPa and a flow rate of 0.57 g/s. FIG. 5 also highlights a typical flow path. Helium circulation is provided by an industrial grade pump. After the fluid passes through the chiller and is cooled to 240 degrees Kelvin, it enters the inlet manifold where it passes through one of six valves (Vlin). This allows the fluid to begin cooling compressor element 1 and continue on its path to precool two compressor elements, namely, elements 2 and 3 and then pass an operational electric heater and heat a compressor element, namely, element 4 to approximately 600 degrees Kelvin. The fluid then goes on to preheat two compressor elements, namely, elements 5 and 6. The fluid then exits through a single valve in the outlet manifold and returns to the pump. This fluid path is maintained for 540 seconds before it is switched so that the total cycle time is 3,240 seconds.

Figure 6:
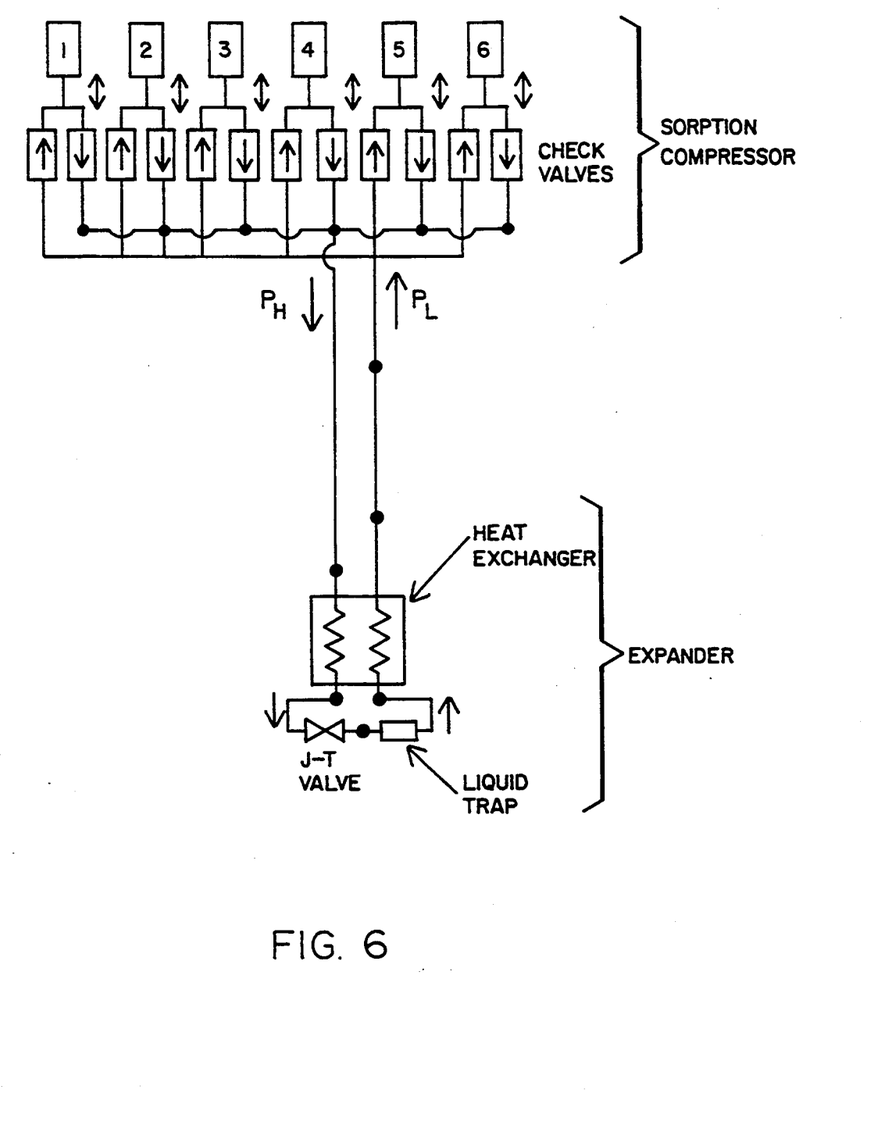
FIG. 6 is a schematic block diagram representation of a refrigerant gas loop configuration of the present invention.

FIG. 6 is a schematic representation of the refrigerant gas loop. This loop is composed of several major components including a Joule-Thomson expansion valve, a low pressure manifold including six self-activated check valves, a high-pressure manifold comprising six self-activated check valves, a precooling heat exchanger and interconnecting plumbing. The refrigerant gas is methane. High pressure gas is supplied to the Joule-Thomson expander by the hot compressor elements at approximately 4.46 MPa and expanded to a low pressure of approximately 0.15 MPa. The refrigerant then returns to a cold compressor element where it is adsorbed. In reducing the system of FIGS. 5 and 6 to practice, several constraints were placed on the system design. The first such constraint is that a low input power requirement must be achieved with components available off the shelf. The second such constraint was that a small volume was necessary in that the entire refrigerator must be able to fit into a 0.457 meter diameter × 0.7112 meter long vacuum bell jar.

Figure 7:
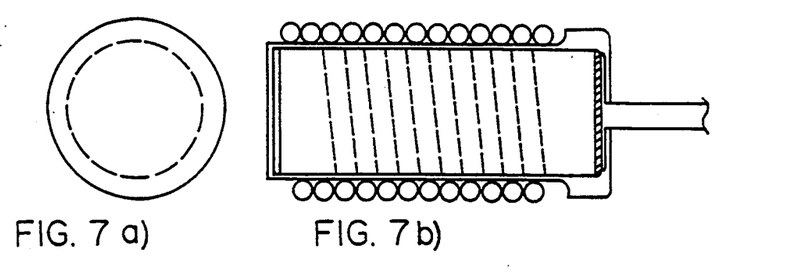

Each compressor element is simply a cannister filled with adsorbent material, i.e., charcoal. The compressor element design for this 4 Watt, 130 degrees Kelvin refrigerator is shown in FIG. 7. The cannister is a 321 stainless steel tube with a 0.051 meter outer diameter and a 0.0016 meter wall and has a length of 0.457 meters. To promote heat transfer, copper foam discs have been brazed to the inside of the cannister which has been filled with approximately 217 grams of powdered charcoal. To heat and cool the elements a 0.0063 outer diameter × 0.0004 wall × 11.89 meter long 321 stainless steel tube is coiled around and brazed to the outside of the cannister. The compressor assembly is completely welded and/or brazed.

The check valves in the helium loop are required to operate from 600 degrees Kelvin to 240 degrees Kelvin. Due to this large temperature swing and in particular, the high temperature, these valves are made of metal and are provided with teflon seals.

The pump is a free-piston linear-drive type. Pump performance characteristics are verified using helium. The pump is commercial grade and normally used in the transfer of medical gases. To prevent the pump seals from bursting at the approximately 2.068 MPa operating pressure, the pump is placed in a pressure vessel which provides a nominal 2.068 MPa pressure for the pump so that the maximum pressure difference is simply the pressure head produced by the pump which is approximately 0.138 MPa.

Table I shows the predicted performance for a 130 degrees Kelvin cooler having the heating/cooling loop of FIG. 5 and the refrigerant gas loop of FIG. 6. As illustrated in Table I, the input power per Watt of cooling required for operation with the regeneration process described herein is 40.7 Watts. On the other hand, if operated without regenerative heating/cooling, this same cooler would require 215 Watts input per Watt of cooling. Therefore, the analysis indicates that approximately 81% of the energy in this system is recycled regeneratively. In other words, the regenerative scheme of the present invention permits operation of a cryogenic sorption cooler with an efficiency which is better than five times what it would be without such a regenerative scheme.

TABLE I

| | | |
|---|---|---|
| Load Temperature | 130 | K |
| Predicted Refrigeration | 4.43 | W Net |
| Regenerator Parameters | | |
| System NTU | 16.8 | |
| Element NTU | 5.6 | |
| Element Effectivity | 0.8549 | |
| Heat Flows | | |
| Regenerator Loss | 138.83 | W |
| Longitudinal Conduction Loss | 12.57 | W |
| Void Volume Loss | 3.94 | W |
| Heat of Desorption | 4.98 | W |
| Environmental Parasitic Loss | 20.00 | W |
| Input Heater Power Requirement | 180.32 | W |
| Specific Power (With Regeneration) | 40.7 | Input W/W of Cooling |
| Specific Power (Without Regeneration) | 215 | Input W/W of Cooling |

It will now be understood that what has been disclosed herein comprises a regenerative sorption compressor assembly for use in a sorption compressor/refrigerator system. The regenerative sorption compressor assembly of the present invention comprises a series of sorption compressor elements connected to a flowing loop of heat transport fluid. The compressor elements are heated and cooled by the heat transport fluid. At some point in the loop the fluid path is broken and the fluid is diverted to a heat source. At another point in the loop the fluid path is broken and the fluid is diverted to a heat sink. The points at which the heating and cooling flows are diverted are switched from compressor element-to-element in the direction of fluid flow at such a rate that the thermal capacity rate of the fluid in the heat transport loop relative to the moving switch point is equal and opposite to the thermal capacity rate of the compressor assembly relative to the switch point. The unique thermal recovery concept of the present invention provides a significant improvement in operating efficiency for a cryogenic refrigerator. In one particular embodiment described herein, the increase in efficiency was greater than a factor of five. Although embodiments of the invention having six or eight compressor elements have been disclosed herein, the actual number of compressor elements in a particular sorption refrigeration system will vary based upon design requirements. The actual thermal fluid flow points in the loop connected respectively to the heat source and the heat sink may be switched by a number of different valve configurations as well as other switching devices all of which are well-known in the fluid flow art and in particular, in the cryogenic fluid plumbing art.

Those having skill in the relevant art to which the present invention pertains, will now, as a result of the applicant's teaching herein, perceive various modifications and additions which may be made to the invention. By way of example, the particular shape and dimensions of the sorbing compressor elements, the sorbing materials contained therein, the heat transport thermal fluid and the refrigerant fluid, as well as the number of compressor elements in a particular fluid loop, may all be varied while still employing the regenerative heating/cooling scheme of the present invention. Accordingly, all such modifications and additions are deemed to be within the scope of the invention which is to be limited only by the claims appended hereto.

I claim:

1. A regenerative sorption compressor assembly, the assembly of the type having compressor elements containing a sorbent material and a refrigerant gas and being in intimate contact with a heating and cooling fluid carrier for applying and removing heat, respectively, from the compressor elements; the assembly comprising:

at least four of said compressor elements arranged in a continuous serial thermal fluid loop;

at least four of heat switching devices, one such device being respectively connected to each of said compressor elements in said thermal fluid loop;

a heat source and a heat sink;

a heat transport fluid and means for causing said heat transport fluid to circulate through said thermal fluid loop at a controlled rate;

each said heat switching device being also connected to said heat source and to said heat sink and being selectively switchable to permit the compressor element to which it is connected to be thermally isolated from the heat source and heat sink or to connect such compressor element to either the heat source or the heat sink;

means for selectively switching said heat switching devices so that at any one time one such heat switching device is configured for heat transfer from said heat source; another such heat switching device is configured for heat transfer to said heat sink, and the remaining such heat switching devices are configured for thermal isolation from both the heat source and the heat sink; and means for controlling said switching sequentially around said loop for maximizing the thermal operating efficiency of said compressor assembly;

wherein said plurality of compressor elements comprises an even number of compressor elements;

said plurality of heat switching devices comprise one such device per compressor element;

alternating compressor elements in said thermal fluid loop being each connected by a respective first one of said heat switching devices to said heat source, each said first heat switching device being selectively switchable to thermally connect said compressor elements to said heat source or to thermally isolate said compressor element from said heat source; and the remaining said compressor elements being each connected by a respective second one of said heat switching devices to said heat sink, each said second heat switching device being selectively switchable to thermally connect said compressor elements to said heat sink or to thermally isolate said compressor element from said heat sink.

2. The assembly recited in claim 1 wherein said switching controlling means switches compressor elements relative to said heat source and said heat sink such that the rate at which the thermal capacity of the compressor elements is switched is substantially equal to the thermal capacity rate of the heat transport-fluid and switching proceeds around the loop in the direction of flow of the heat transport fluid.

3. The assembly recited in claim 1 wherein said switching controlling means controls the heat switching device switching times around said thermal fluid loop so that the ratio of the rate at which compressor heat capacity is switched to the thermal capacity rate of the heat transport fluid is in the range of about 0.8 and 1.0.

4. The assembly recited in claim 1 wherein at all times a heat switching device connected to said heat source and a heat switching device connected to said heat sink are positioned at substantially opposite locations around said thermal fluid loop.

5. A regenerative sorption compressor assembly, the assembly of the type having compressor elements containing a sorbent material and a refrigerant gas and being in intimate contact with a heating and cooling fluid carrier for applying and removing heat, respectively, from the compressor elements; the assembly comprising:

at least four of said compressor elements arranged in a continuous serial thermal fluid loop;

at least four of heat switching devices, one such device being respectively connected to each of said compressor elements in said thermal fluid loop;

a heat source and a heat sink;

a heat transport fluid and means for causing said heat transport fluid to circulate through said thermal fluid loop at a controlled rate;

each said heat switching device being also connected to said heat source and to said heat sink and being selectively switchable to permit the compressor element to which it is connected to be thermally isolated from the heat source and heat sink or to connect such compressor element to either the heat source or the heat sink;

means for selectively switching said heat switching devices so that at any one time one such heat switching device is configured for heat transfer from said heat source; another such heat switching device is configured for heat transfer to said heat sink, and the remaining such heat switching devices are configured for thermal isolation from both the heat source and the heat sink; and means for controlling said switching sequentially around said loop for maximizing the thermal operating efficiency of said compressor assembly;

wherein said heat switching devices are flow diverting devices, such devices being selectively switchable to permit the heat transport fluid leaving one compressor element to pass directly to the next compressor element in said serial thermal fluid loop, or to be diverted to said heat source or said heat sink and then to the next compressor element.

6. A regenerative sorption compressor assembly, the assembly of the type having compressor elements containing a sorbent material and a refrigerant gas and being in intimate contact with a heating and cooling fluid carrier for applying and removing heat, respectively, from the compressor elements; the assembly comprising:

at least four of said compressor elements arranged in a continuous serial thermal fluid loop;

at least four of heat switching devices, one such device being respectively connected to each of said compressor elements in said thermal fluid loop;

a heat source and a heat sink;

a heat transport fluid and means for causing said heat transport fluid to circulate through said thermal fluid loop at a controlled rate;

each said heat switching device being also connected to said heat source and to said heat sink and being selectively switchable to permit the compressor element to which it is connected to be thermally isolated from the heat source and heat sink or to connect such compressor element to either the heat source or the heat sink;

means for selectively switching said heat switching devices so that at any one time one such heat switching device is configured for heat transfer from said heat source; another such heat switching device is configured for heat transfer to said heat sink, and the remaining such heat switching devices are configured for thermal isolation from both the heat source and the heat sink; and means for controlling said switching sequentially around said loop for maximizing the thermal operating efficiency of said compressor assembly;

wherein said heat source and said heat switching devices comprise a plurality of electrical resistance heaters, a respective electrical resistance heater being attached to each of said compressor elements and being selectively switchable to heat or not to heat a respective compressor element.

7. A regenerative sorption compressor assembly, the assembly of the type having compressor elements containing a sorbent material and a refrigerant gas and being in intimate contact with a heating and cooling fluid carrier for applying and removing heat, respectively, from the compressor elements; the assembly comprising:

at least four of said compressor elements arranged in a continuous serial thermal fluid loop;

at least four of heat switching devices, one such device being respectively connected to each of said compressor elements in said thermal fluid loop;

a heat source and a heat sink;

a heat transport fluid and means for causing said heat transport fluid to circulate through said thermal fluid loop at a controlled rate;

each said heat switching device being also connected to said heat source and to said heat sink and being selectively switchable to permit the compressor element to which it is connected to be thermally isolated from the heat source and heat sink or to connect such compressor element to either the heat source or the heat sink;

means for selectively switching said heat switching devices so that at any one time one such heat switching device is configured for heat transfer from said heat source; another such heat switching device is configured for heat transfer to said heat sink, and the remaining such heat switching devices are configured for thermal isolation from both the heat source and the heat sink; and means for controlling said switching sequentially around said loop for maximizing the thermal operating efficiency of said compressor assembly;

wherein said sorbent material is charcoal and said refrigerant gas is methane.

8. A regenerative sorption compressor assembly, the assembly of the type having compressor elements containing a sorbent material and a refrigerant gas and being in intimate contact with a heating and cooling fluid carrier for applying and removing heat, respectively, from the compressor elements; the assembly comprising:

at least four of said compressor elements arranged in a continuous serial thermal fluid loop;

at least four plurality of heat switching devices, one such device being respectively connected to each of said compressor elements in said thermal fluid loop;

a heat source and a heat sink;

a heat transport fluid and means for causing said heat transport fluid to circulate through said thermal fluid loop at a controlled rate;

each said heat switching device being also connected to said heat source and to said heat sink and being selectively switchable to permit the compressor element to which it is connected to be thermally isolated from the heat source and heat sink or to connect such compressor element to either the heat source or the heat sink;

means for selectively switching said heat switching devices so that at any one time one such heat switching device is configured for heat transfer from said heat source; another such heat switching device is configured for heat transfer to said heat sink, and the remaining such heat switching devices are configured for thermal isolation from both the heat source and the heat sink; and means for controlling said switching sequentially around said loop for maximizing the thermal operating efficiency of said compressor assembly;

wherein said heating and cooling fluid is helium.

9. A regenerative sorption compressor assembly, the assembly of the type having compressor elements containing a sorbent material and a refrigerant gas and being in intimate contact with a heating and cooling fluid carrier for applying and removing heat, respectively, from the compressor elements; the assembly comprising:

at least four of said compressor elements arranged in a continuous serial thermal fluid loop;

at least four of heat switching devices, one such device being respectively connected to each of said compressor elements in said thermal fluid loop;

a heat source and a heat sink;

a heat transport fluid and means for causing said heat transport fluid to circulate through said thermal fluid loop at a controlled rate;

each said heat switching device being also connected to said heat source and to said heat sink and being selectively switchable to permit the compressor element to which it is connected to be thermally isolated from the heat source and heat sink or to connect such compressor element to either the heat source or the heat sink;

means for selectively switching said heat switching devices so that at any one time one such heat switching device is configured for heat transfer from said heat source; another such heat switching device is configured for heat transfer to said heat sink, and the remaining such heat switching devices are configured for thermal isolation from both the heat source and the heat sink; and means for controlling said switching sequentially around said loop for maximizing the thermal operating efficiency of said compressor assembly;

wherein the lowest cooling temperature thereof is less than about 200 degrees Kelvin.

10. A method for increasing the efficiency of a sorption compressor assembly, the assembly of the type having compressor elements containing a sorbent material and a refrigerant gas and being in intimate contact with a heat transport fluid carrier for applying and removing heat, respectively, from the compressor elements; the method comprising the steps of:

a) arranging said compressor elements in a continuous serial thermal fluid loop;
b) providing a heat source and a heat sink;
c) connecting a first point in said fluid loop to said heat source and a second point in said fluid loop to said heat sink;
d) periodically switching said first and second points for maximizing the thermal operating efficiency of said assembly;
wherein in step d), said switching is accomplished so that the rate at which the thermal capacity of said compressor elements is switched is substantially equal to the thermal capacity rate of the heat transport fluid and switching proceeds around the loop in the direction of flow of said heat transport fluid.

11. A method for increasing the efficiency of a sorption compressor assembly, the assembly of the type having compressor elements containing a sorbent material and a refrigerant gas and being in intimate contact with a heat transport fluid carrier for applying and removing heat, respectively, from the compressor elements; the method comprising the steps of:
a) arranging said compressor elements in a continuous serial thermal fluid loop;
b) providing a heat source and a heat sink;
c) connecting a first point in said fluid loop to said heat source and a second point in said fluid loop to said heat sink;
d) periodically switching said first and second points for maximizing the thermal operating efficiency of said assembly;
wherein in step d), said switching is accomplished at a rate such that the ratio of the rate at which compressor heat capacity is switched to the thermal capacity rate of the heat transport fluid is in the range of about 0.8 to 1.0.

12. The assembly recited in claim 5 wherein said switching controlling means switches compressor elements relative to said heat source and said heat sink such that the rate at which the thermal capacity of the compressor elements is switched is substantially equal to the thermal capacity rate of the heat transport-fluid and switching proceeds around the loop in the direction of flow of the heat transport fluid.

13. The assembly recited in claim 5 wherein said switching controlling means controls the heat switching device switching times around said thermal fluid loop so that the ratio of the rate at which compressor heat capacity is switched to the thermal capacity rate of the heat transport fluid is in the range of about 0.8 and 1.0.

14. The assembly recited in claim 5 wherein at all times a heat switching device connected to said heat source and a heat switching device connected to said heat sink are positioned at substantially opposite locations around said thermal fluid loop.

15. The assembly recited in claim 6 wherein said switching controlling means switches compressor elements relative to said heat source and said heat sink such that the rate at which the thermal capacity of the compressor elements is switched is substantially equal to the thermal capacity rate of the heat transport-fluid and switching proceeds around the loop in the direction of flow of the heat transport fluid.

16. The assembly recited in claim 6 wherein said switching controlling means controls the heat switching device switching times around said thermal fluid loop so that the ratio of the rate at which compressor heat capacity is switched to the thermal capacity rate of the heat transport fluid is in the range of about 0.8 and 1.0.

17. The assembly recited in claim 6 wherein at all times a heat switching device connected to said heat source and a heat switching device connected to said heat sink are positioned at substantially opposite locations around said thermal fluid loop.

18. The assembly recited in claim 7 wherein said switching controlling means switches compressor elements relative to said heat source and said heat sink such that the rate at which the thermal capacity of the compressor elements is switched is substantially equal to the thermal capacity rate of the heat transport-fluid and switching proceeds around the loop in the direction of flow of the heat transport fluid.

19. The assembly recited in claim 7 wherein said switching controlling means controls the heat switching device switching times around said thermal fluid loop so that the ratio of the rate at which compressor heat capacity is switched to the thermal capacity rate of the heat transport fluid is in the range of about 0.8 and 1.0.

20. The assembly recited in claim 7 wherein at all times a heat switching device connected to said heat source and a heat switching device connected to said heat sink are positioned at substantially opposite locations around said thermal fluid loop.

21. The assembly recited in claim 8 wherein said switching controlling means switches compressor elements relative to said heat source and said heat sink such that the rate at which the thermal capacity of the compressor elements is switched is substantially equal to the thermal capacity rate of the heat transport-fluid and switching proceeds around the loop in the direction of flow of the heat transport fluid.

22. The assembly recited in claim 8 wherein said switching controlling means controls the heat switching device switching times around said thermal fluid loop so that the ratio of the rate at which compressor heat capacity is switched to the thermal capacity rate of the heat transport fluid is in the range of about 0.8 and 1.0.

23. The assembly recited in claim 8 wherein at all times a heat switching device connected to said heat source and a heat switching device connected to said heat sink are positioned at substantially opposite locations around said thermal fluid loop.

24. The assembly recited in claim 9 wherein said switching controlling means switches compressor elements relative to said heat source and said heat sink such that the rate at which the thermal capacity of the compressor elements is switched is substantially equal to the thermal capacity rate of the heat transport-fluid and switching proceeds around the loop in the direction of flow of the heat transport fluid.

25. The assembly recited in claim 9 wherein said switching controlling means controls the heat switching device switching times around said thermal fluid loop so that the ratio of the rate at which compressor heat capacity is switched to the thermal capacity rate of the heat transport fluid is in the range of about 0.8 and 1.0.

26. The assembly recited in claim 9 wherein at all times a heat switching device connected to said heat source and a heat switching device connected to said heat sink are positioned at substantially opposite locations around said thermal fluid loop.

* * * * *